United States Patent [19]

Iwamatsu et al.

[11] Patent Number: 4,914,676
[45] Date of Patent: Apr. 3, 1990

[54] CROSS POLARIZATION INTERFERENCE CANCELLER

[75] Inventors: Takanori Iwamatsu, Otawara; Yoshihiro Nozue, Nasu, both of Japan

[73] Assignee: Fujitsu Limited, Kawasaki, Japan

[21] Appl. No.: 245,216

[22] Filed: Sep. 16, 1988

[30] Foreign Application Priority Data

Sep. 18, 1987 [JP] Japan ................................. 62-232485

[51] Int. Cl.⁴ ............................................. H04B 1/10
[52] U.S. Cl. ..................................... 375/102; 455/60; 455/276; 455/295
[58] Field of Search ..................... 375/14, 15, 38, 100, 375/102, 103; 370/6, 20; 455/60, 273, 276, 278, 283, 295; 342/361

[56] References Cited

U.S. PATENT DOCUMENTS

| | | | |
|---|---|---|---|
| 4,112,370 | 9/1978 | Monsen | 370/6 |
| 4,575,862 | 3/1986 | Tahara et al. | 375/102 |
| 4,577,330 | 3/1986 | Kavehrad | 375/15 |
| 4,631,734 | 12/1986 | Foschini | 375/102 |
| 4,688,235 | 8/1987 | Tahara et al. | 455/60 |
| 4,757,319 | 7/1988 | Lankl | 375/102 |

Primary Examiner—Benedict V. Safourek
Assistant Examiner—Stephen Chin
Attorney, Agent, or Firm—Staas & Halsey

[57] ABSTRACT

A cross polarization interference canceller cancels interference polarization by providing a phase difference detecting circuit for detecting a phase difference between a main polarization and an interference polarization component of the main polarization, and a phase shifter for shifting a data discrimination clock signal of the interference polarization wave component.

14 Claims, 5 Drawing Sheets

PRINCIPAL BLOCK DIAGRAM OF INVENTION

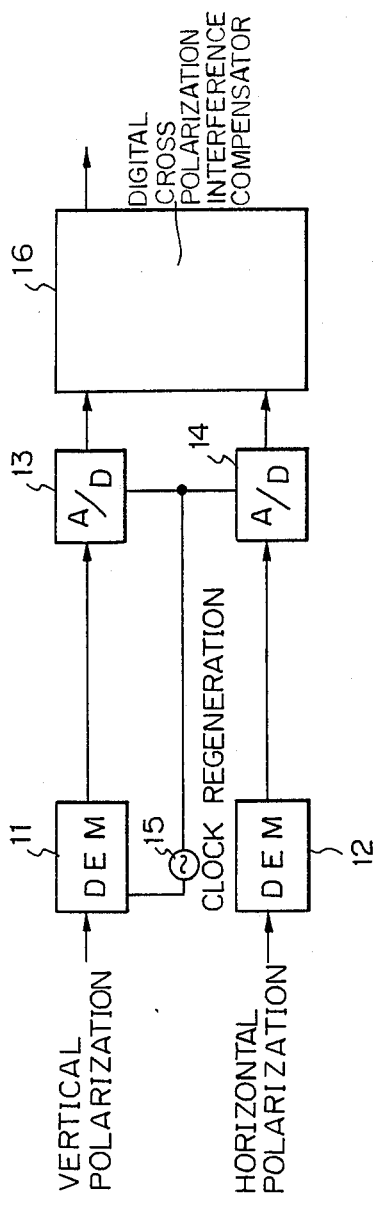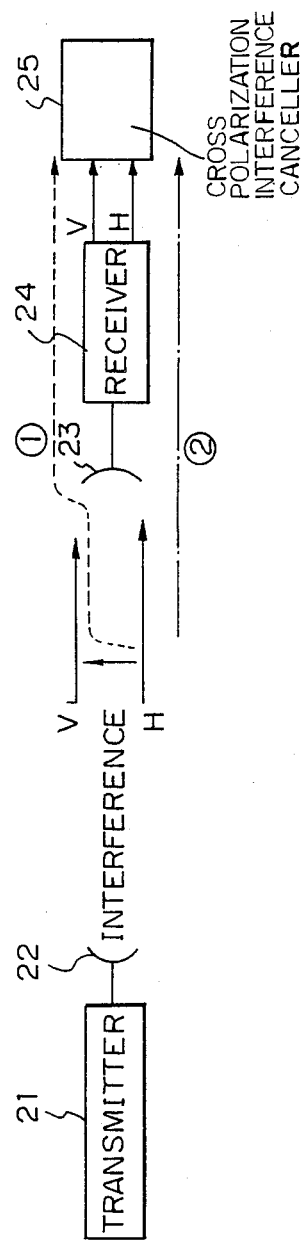

PRINCIPAL BLOCK DIAGRAM OF INVENTION

INTERFERENCE WAVE OF POSITIVE INCLINATION

CROSS POLARIZATION INTERFERENCE CANCELLER

BACKGROUND OF THE INVENTION

Field of the Invention

The present invention relates to a cross polarization interference canceller in a digital radio transmission.

By using orthogonal planes of polarization (vertical polarization and horizontal polarization) in the same frequency band, the transmission capacity can be doubled, in comparison to a transmission with a single polarization, and thus the frequency band is used in a more efficient manner.

Nevertheless, multipath fading, etc., on a transmission path tend to blur the discrimination between the polarizations. To prevent this blurring of discrimination, a cross polarization interference cancelling technique is used at the receiver side.

Description of the Related Art

In a conventional cross polarization interference canceller, a time difference between the main polarization and the interference wave component is not taken into consideration. Therefore the ability to cancel the cross polarization interference is not satisfactory, as later described in more detail with reference to the drawings.

SUMMARY OF THE INVENTION

An object of the present invention is to increase the ability to cancel the interference polarization in an interference polarization canceller.

To attain the above object, according to the present invention, there is provided a cross polarization interference canceller comprising: first and second demodulators for receiving a main polarization and a cross polarization that have orthogonal planes of polarization, respectively, of a transmitted signal and demodulating the transmitted signal by a synchronous detection; a clock signal regenerating circuit for regenerating a data discrimination clock signal from the main polarization received by the first demodulator; a first A/D converter for sampling a demodulated signal of the main polarization output from the first demodulator by using the data discrimination clock signal to obtain a demodulated digital signal of the main polarization; a phase shifter for shifting a phase of the data discrimination clock signal; a second A/D converter for sampling a demodulated signal of the cross polarization output from the second demodulator by using an output of the phase shifter to obtain a demodulated digital signal of the cross polarization; an interference wave component extracting means for extracting an interference wave component with respect to the main polarization from an output of the second A/D converter; a subtracter for subtracting an output of the interference wave component extracting means from an output of the first A/D converter; and a phase difference detecting means for detecting a phase deviation of the interference wave component with respect to the main polarization from outputs of the interference wave component extracting means and the subtracter.

The phase shifter is controlled by an output of the phase difference detecting means.

BRIEF DESCRIPTION OF THE DRAWINGS

The above object and features of the present invention will be more apparent from the following description of the preferred embodiment, wherein:

FIG. 1 is a block diagram showing an example of a conventional cross polarization interference compensaator;

FIG. 2 is a block diagram illustrating problems in the conventional system of FIG. 1;

DESCRIPTION OF THE PREFERRED EMBODIMENTS

Figure 3:
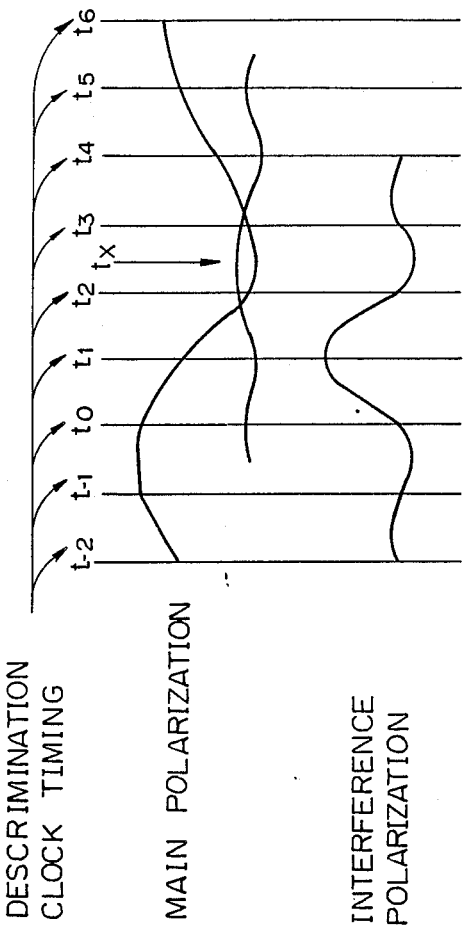
FIG. 3 is a diagram a time delay of an interference wave interfering with a main polarization.

For a better understanding of the present invention, the conventional equipment and the problems therein will be first described with reference to FIGS. 1 to 3.

FIG. 1 is a block diagram showing an example of a conventional cross polarization interference canceller. In the figure, received vertical and horizontal polarizations are demodulated by demodulators (DEM) 11 and 12 and converted by A/D converters 13 and 14 into demodulated digital signals, respectively. The A/D converters 13 and 14 sample the polarizations by a data discrimination clock signal regenerated in a clock signal regenerating circuit 15 from the vertical polarization, i.e., the main polarization received by the demodulator 11. Since the main polarization, i.e., the vertical polarization, contains part of the horizontal polarization as an interference wave component, a digital cross polarization interference compensator (digital XPIC) 16 removes the interference wave component from the main polarization to obtain a correct main polarization reception signal. Generally, the XPIC 16 is a transversal type unit.

In the above-mentioned conventional canceller, if a time difference exists between the interference wave component contained in the main polarization and the cancelling interference wave component, i.e., the cross polarization, the time difference may lower the capacity to cancel the cross polarization wave interference. This will be explained with reference to FIGS. 2 and 3.

In FIG. 2, a signal including both polarizations from a transmitter 21 is radiated as a vertical (V) polarization and a horizontal (H) polarization from an antenna 22. The signal is received by an antenna 23 and separated into the vertical (V) polarization and the horizontal (H) polarization by a receiver 24, and then a cross polarization interference canceller XPIC 25 removes an interference wave component.

In this case, in a transmission path between the antennas 22 and 23, part of the horizontal polarization interferes with the vertical polarization to form an interference wave component ①, which is removed by using the horizontal polarization as a compensating interference wave component ②. Nevertheless, if a time difference exists between the wave components ① and 2 at inputs of the XPIC 25, the cancelling capacity will be reduced.

FIG. 3 shows an example of the time difference.

In the figure, reference marks $t_{-2}, t_{-1}, t_0, t_1, t_2, t_3, \ldots$ are data discrimination timings of a data discrimination clock signal output to the A/D converters 13 and 14. For simplicity, the cancelling interference wave is shown as an impulse at the time $t_1$. The interference wave on the main polarization is delayed and input to the XPIC 16 at a time $t_x$ which is assumed to be a timing other than the data discrimination timing. At the data discrimination timings $t_0$, $t_1$, $t_2$ and $t_3$, the XPIC 16 subtracts the cancelling interference wave component from the main polarization to remove the interference wave component on the main polarization, and thus bring errors in the main polarization to zero. But, it is impossible to reduce the errors to zero at timings other than the discrimination timings, and therefore, the delayed interference wave at the time $t_x$ cannot be removed. This is because the sampling is carried out at a frequency band width which is less than double the frequency band width of the transmission signal according to a sampling theorem and, therefore, data having a frequency exceeding the sampling frequency cannot be reproduced. As described above, since the interference wave at the time $t_x$ remains in the main polarization, a cancelling capacity of the conventional cross polarization interference canceller is reduced.

An embodiment of the present invention will now be described.

Figure 4:
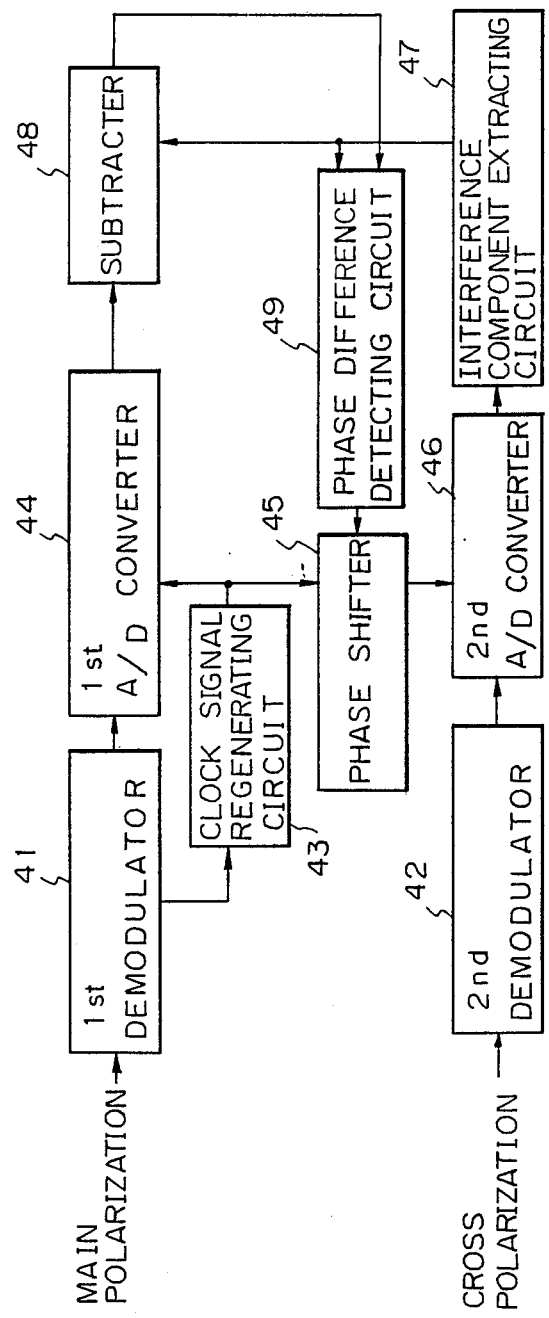
FIG. 4 is a principal block diagram of an embodiment of the present invention.

FIG. 4 is a principle block diagram of a cross polarization interference canceller according to an embodiment of the present invention.

In the figure, a cross polarization interference canceller according to the present invention comprises first and second demodulators 41 and 42, a clock signal regenerating circuit 43, a first A/D converter 44, a phase shifter 45, a second A/D converter 46, an interference wave component extracting circuit 47, a subtracter 48, and a phase difference detecting circuit 49. The first and second demodulators 41 and 42 receive a main polarization and a cross polarization having orthogonal planes of polarization, respectively, of a transmitted signal, and demodulate the transmitted signal by a synchronous detection technique. The clock signal regenerating circuit 43 regenerates a data discrimination clock signal from the main polarization received by the first demodulator 41. The first A/D converter 44 samples a demodulated signal of the main polarization obtained at an output of the first demodulator 41 in response to the data discrimination clock signal and provides a demodulated digital signal of the main polarization. The phase shifter 45 shifts a phase of the data discrimination clock signal in response to an output of the phase difference detecting circuit 49. The second A/D converter 46 samples a demodulated signal of the cross polarization obtained at an output of the second demodulator 42 and provides a demodulated digital signal of the cross polarization. The interference wave component extracting circuit 47 extracts an interference wave component with respect to the main polarization from an output of the second A/D converter 46. The subtracter 48 subtracts an output of the interference wave component extracting circuit 47 from an output of the first A/D converter, and the phase difference detecting circuit 49 detects a phase deviation of the interference wave component with respect to the main polarization in response to the outputs of the interference wave component extracting circuit 47 and subtracter 48.

In operation, the phase difference detecting circuit 49 detects a phase difference of the interference wave with respect to the main polarization, and a phase of the data discrimination clock signal is shifted by the phase shifter 45 in accordance with the phase difference. Therefore, even if the interference wave interfering with the main polarization is delayed with respect to the cross polarization, the interference wave component can be removed at a data discrimination timing of the data discrimination clock signal.

Figure 5:
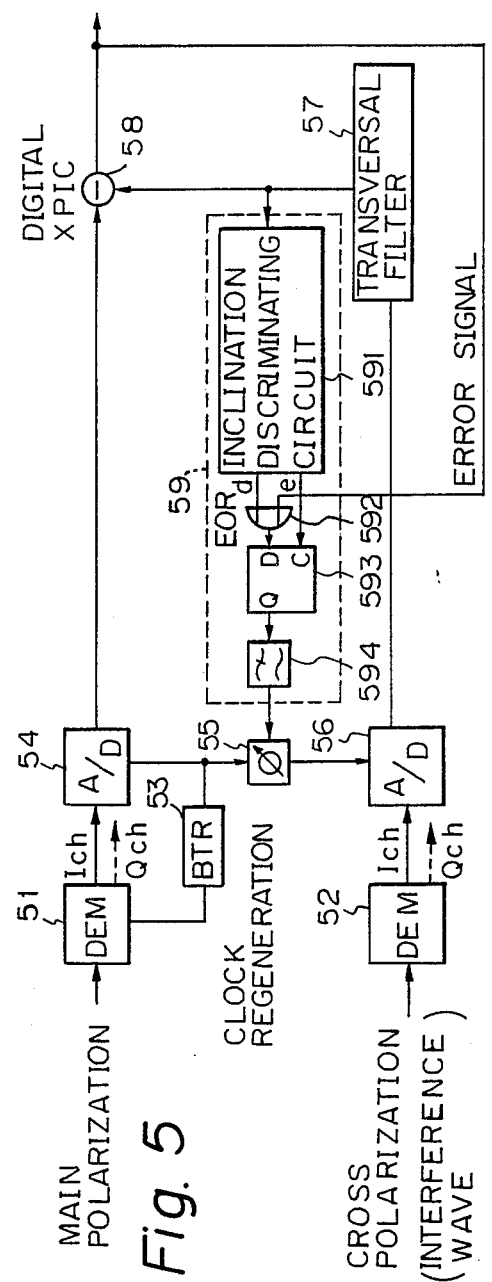
FIG. 5 is a detailed block diagram of the embodiment of the present invention illustrated in FIG. 4.

FIG. 5 is a block diagram showing in more detail the cross polarization interference canceller according to the embodiment of the present invention.

In the figure, reference numerals 51 to 59 correspond to reference numerals 41 to 49 of the principal block diagram of FIG. 4. The interference wave component extracting circuit 47 is realized in FIG. 5 by a transversal filter 57; the subtracter 48 in FIG. 5 is realized by a digital cross polarization interference canceller (XPIC) 58; and the phase difference detecting circuit 49 is realized in FIG. 5 by a phase difference detecting circuit 59, which comprises an inclination discriminating circuit 591, an exclusive OR gate 592, a discriminated result latching flip-flop 593, and a loop filter 594.

The inclination discriminating circuit 591 discriminates an inclination of an interference wave, i.e., a cross polarization, as positive ("0") or as negative ("1") by using a technique to be described later.

The exclusive OR gate 592 operates an exclusive logical sum of the above-mentioned inclination and an error signal in an output of the main polarization and provides a discriminated result to a data input D of the flip-flop 593. If the inclination can be determined, the inclination discriminating circuit 591 sends a signal "1" to a clock input C of the flip-flop 593 to latch the discriminated result in the flip-flop 593. If the inclination can not be determined, the inclination discriminating circuit 591 sends a signal "0" to the clock input C of the flip-flop 593, to hold the previously latched data in the discriminated result latching flip-flop 593.

The loop filter 594 carries out an integration calculation of the output of the discriminated result latching flip-flop 593. The integrated amount indicates a phase deviation by which the interference wave component is to be shifted with respect to the main polarization. Therefore, a phase in the phase shifter 55 is shifted according to the integrated amount so that a data discrimination timing of the A/D converter 56 is automatically adjusted.

The following table shows the relationship between an inclination of the interference wave component extracted at an output of the transversal filter 57, the error signal in the regenerated signal obtained at the output of the subtracter 58, and an output of the exclusive OR gate 592.

| INCLINATION OF INTERFERENCE WAVE | MAIN POLARIZATION ERROR | OUTPUT OF EOR 592 |
|---|---|---|
| POSITIVE (0) | 0 | TO ADVANCE (0) |
|  | 1 | TO DELAY (1) |
| NEGATIVE (1) | 0 | TO DELAY (1) |
|  | 1 | TO ADVANCE (0) |

As shown in the above table, a positive inclination is expressed as "0", a negative inclination is expressed as "1", the need to advance of a timing of the interference wave with respect to the main polarization is expressed as "0" and the need to delay same is expressed as "1". Accordingly, the following is established:

Inclination of the interference wave $\oplus$ Error signal of the main polarization = Timing of the interference wave.

Here the mark $\oplus$ represents the exclusive logical sum.

Figure 6:
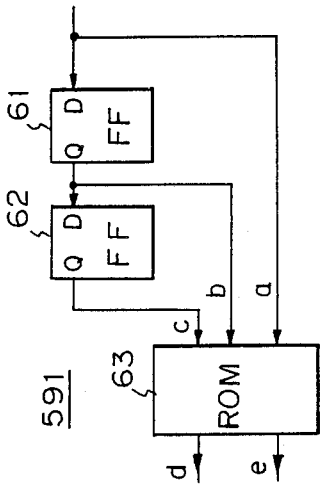
FIG. 6 is a block diagram of the inclination discriminating circuit in the equipment shown in FIG. 5.

FIG. 6 is a block diagram of an example of the construction of the inclination discriminating circuit 591 shown in FIG. 5.

As shown in FIG. 6, the inclination discriminating circuit 591 is constructed by flip-flops 61 and 62 and a read only memory (ROM) 63 for storing a table in which the relationships between the input values a, b, and c and the output indicating position or negative inclination are stored. The value a is supplied from the output of the transversal filter 57 to the input of the flip-flop 61; the value b is the input of the next-stage flip-flop 62; and the value c is the output of the flip-flop 63. The ROM 63 can determine the inclination by evaluating the input values a, b, and c.

Figure 7:
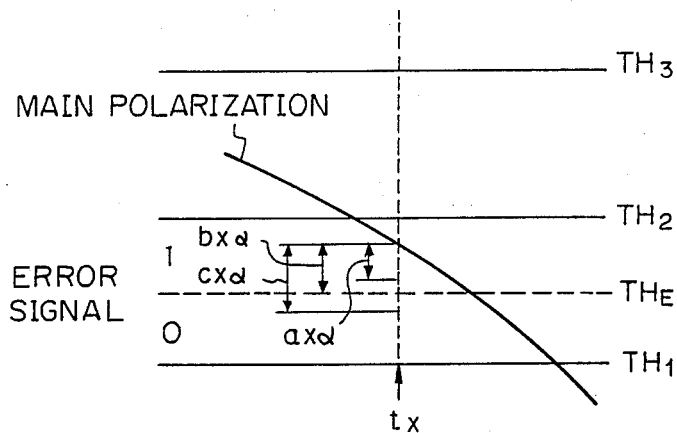
FIGS. 7 and 8 are graphs showing the relationships between error signals of a main polarization and phase differences of an interference wave for the main polarization.

FIG. 7 is a graph showing an example of the relationship between the error signal and the main polarization. In the figure, $TH_1$, $TH_2$, $TH_3$, ... represent threshold levels for discriminating the levels of the main polarization, and the curve represents the main polarization. The inclination of the curve in this example is negative. The horizontal dotted line provided at the half level between adjacent threshold levels $TH_1$ and $TH_2$ represents an error threshold level $TH_E$ for discriminating the error signal of the main polarization. In the example shown in FIG. 7, the main polarization at the discriminating timing $t_x$ is higher than the error threshold level $TH_E$ by $(b \times \alpha)$. Namely, the error signal in this example is "1". This eror signal is considered to have been caused by the interference of the interference wave component with the main polarization.

Figure 8:
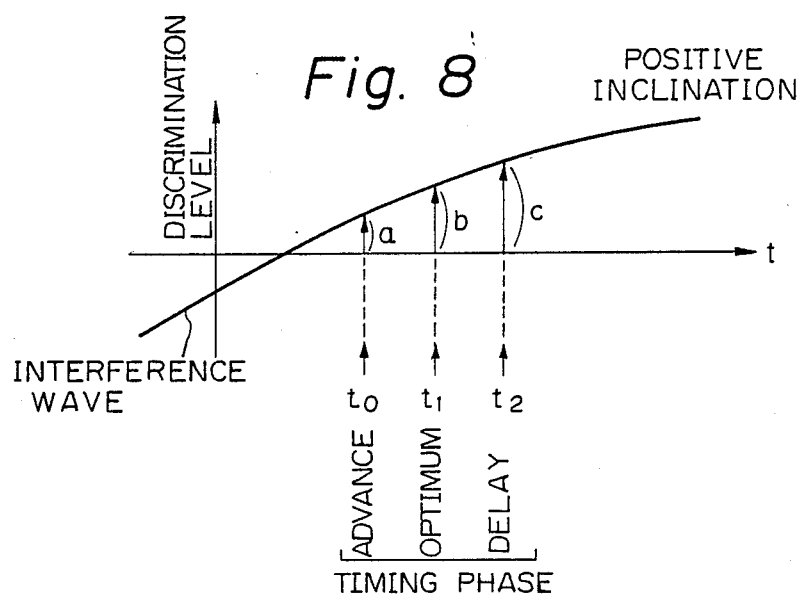

FIG. 8 is a graph showing an example of the interference wave, wherein the inclination of the curve of the interference wave is positive, i.e., "0". As shown in the Figure, at a time $t_0$, the discrimination level of the interference wave is "a"; at a time $t_1$, the discrimination level of the interference wave is "b"; and at a time $t_2$, the discrimination level of the interference wave is "c". Therefore, due to the positive inclination, the relationship, $a<b<c$, is satisfied.

Referring to FIGS. 7 and 8, if the discrimination level of the interference wave at the discriminating timing $t_x$ is "b", the digital XPIC 58 subtracts a value $(b \times \alpha)$ from the main polarization, and thus the error signal at the output of the XPIC 58 is made zero.

If the discrimination level of the interference wave at the discriminating timing $t_x$ is "a", the digital XPIC 58 subtracts the value $(a \times \alpha)$ from the main polarization, and in this case, the error signal of the main polarization after the subtraction will be "1" at the discrimination timing $t_x$. Since the inclination of the interference wave is "0" in this example, and since the error signal is "1" as mentioned above, the output of the EOR gate 592 is "1", and thus the phase of the interference wave is delayed, as can be seen from the Table above.

Conversely, if the phase of the interference wave lags behind the phase of the main polarization, a value $(c \times a)$ $(c>b)$ is subtracted from the main polarization by the XPIC 58, and thus the error signal of the main polarization after the subtraction is "0" at the discrimination timing $t_x$. Since the inclination is "0" and the error "0" in the above table, the phase of the interference wave is advanced.

Similarly, if the inclination of the interference wave is negative ("1"), the error signal is processed in accordance with a delay or an advance of the phase.

To obtain an inclination of the interference wave, three consecutive times $t_0$, $t_1$, and $t_2$, for example, are considered, and therefore, if the signal level is monotonously increased, the inclination is considered to be positive, and if the signal is monotonously decreased, the inclination is considered to be negative.

The interference wave may not always have a monotonously increased inclination or a monotonously decreased inclination, even when the levels at the consecutive timings represent a monotonous increase or decrease. For example, the interference wave may be changed between two discriminating timings along a parabolic orbit, but even in this case, by storing simulated results in the ROM 63, a discriminating result showing whether the clock phase should be advanced or delayed can be appropriately obtained at the output d of the ROM 63.

Note that the other output e of the inclination discriminating circuit 591 or the ROM 63 indicates that discrimination of the inclination was impossible, and in this case, the latching circuit 593 receives "0" at the clock input C thereof, and thus the latching circuit 593 holds the previous state.

As described above, according to the present invention, a phase of an interference wave is shifted in response to a phase deviation of an interference wave component with respect to a main polarization, and as a result, in a cross polarization interference canceller, the capacity for cancelling a cross polarization interference is remarkably improved. Unlike the prior art, in which a cancelling amount is varied at the cycle of a data discrimination clock signal, the present invention provides an effect whereby an optimum continuous cancelling amount without cyclical variation is obtained.

We claim:

1. A cross polarization interference canceller comprising:

first and second demodulators for receiving a main polarization and a cross polarization that have orthogonal planes of polarization, respectively, of a transmitted signal and for demodulating the transmitted signal by a synchronous detection to produce a demodulated main polarization and a demodulated cross polarization, respectively;

a clock signal regenerating circuit having an input receiving the demodulated main polarization from said first demodulator for regenerating a data discrimination clock signal having a phase from the main polarization received by said first demodulator;

a first A/D converter having an input receiving the demodulated main polarization from said first demodulator for sampling the demodulated main polarization from said first demodulator by using the data discrimination clock signal to obtain a demodulated digital signal of the main polarization;

a phase shifter having an input receiving the data discrimination clock signal from said clock signal regenerating circuit for shifting the phase of the data discrimination clock signal to produce a phase shifted clock signal;

a second A/D converter, having a first input receiving the demodulated cross polarization from said second demodulator and a second input receiving the phase shifted clock signal from said phase shifter, for sampling the demodulated cross polarization from said second demodulator by using the phase shifted clock signal to obtain a demodulated digital signal of the cross polarization;

interference wave component extracting means for extracting an interference wave component with respect to the main polarization from the demodulated digital signal of said second A/D converter;

a subtracter, having first and second inputs receiving the interference wave component from said interference wave component extracting means and the demodulated digital signal of the main polarization from said first A/D converter, for subtracting the interference wave component from the demodulated digital signal of the main polarization to produce a subtraction output; and phase difference detecting means for detecting a phase deviation of the interference wave component with respect to the main polarization from the interference wave component and the subtraction output, said phase shifter being operatively connected to and controlled by said phase difference detecting means.

2. A cross polarization interference canceller as claimed in claim 1, wherein said phase difference detecting means comprises an inclination discriminating circuit having an input connected to said interference wave component extracting means, having a first output operatively connected to said phase shifter, for discriminating an inclination of the interference wave component with respect to the main polarization, and having a second output for providing an output signal indicating whether or not a discrimination of said inclination is possible.

3. A cross polarization interference canceller as claimed in claim 2, wherein said phase difference detecting means further comprises an exclusive OR gate having a first input connected to the first output of said inclination discriminating circuit, a second input connected to the subtraction output of said subtracter and an output operatively connected to an input of said phase shifter, the output of said exclusive OR gate providing a discriminated result indicating whether a phase of the interference wave component should be advanced or delayed.

4. A cross polarization interference canceller as claimed in claim 3, wherein said phase difference detecting means further comprises a discriminated result latching flip-flop having a latching input connected to the output of said exclusive OR gate, a clock input connected to the second output of said inclination discriminating circuit, and an output operatively connected to said phase shifter, so that when said inclination discriminating circuit discriminates the inclination of the interference wave component, the discriminated result is latched in said discriminated result latching flip-flop, and when said inclination discriminating circuit can not discriminate the inclination, said discriminated result latching flip-flop holds previous data.

5. A cross polarization interference canceller as claimed in claim 4, wherein said phase difference detecting means further comprises a loop filter having an input connected to the output of said discriminated result latching flip-flop and having an output connected to the input of said phase shifter, for integrating the discriminated result output from said flip-flop.

6. A cross polarization interference canceller as claimed in claim 5, wherein said discriminated result latching flip-flop latches a discriminated result indicating whether the phase of said interference wave component should be advanced or delayed and output from the output of said exclusive OR gate, and holds the previous data when the clock input of said discriminated result latching flip-flop receives the discriminated result indicating that discrimination was impossible from the second output of said inclination discriminating circuit.

7. A cross polarization interference canceller as claimed in claim 5, wherein said inclination discriminating circuit includes a first flip-flop having a latching input connected to said interference component extracting circuit and an output, a second flip-flop having a latching input connected to the output of said first flip-flop and an output, and a read only memory, having a first input connected to the output of said interference component extracting circuit, a second input connected to the output of said first flip-flop and a third input connected to the output of said second flip-flop, for storing data of inclinations corresponding to a combination of the first, second and third inputs of said read only memory, said read only memory having a first output connected to the first input of said exclusive OR gate for providing the discriminated result of the inclination, and having a second output connected to the clock input of said discriminated result latching flip-flop for providing an enable signal to be applied to the clock input of the discriminated result latching flip-flop when discrimination is possible.

8. A cross polarization interference canceller as claimed in claim 1, wherein said subtracter is a digital cross polarization interference canceller.

9. A cross polarization interference canceller as claimed in claim 1, wherein said interference component extracting means is a transversal filter.

10. A cross polarization interference canceller as claimed in claim 5, wherein the output of said loop filter indicates an amount of shift of the phase of the interference wave component.

11. A method for cancelling cross polarization interference in a transmission signal having main and cross polarizations, comprising the steps of:
(a) demodulating the main and cross polarizations;
(b) regenerating a clock signal from the main polarization to produce a regenerated clock;
(c) digitizing the main polarization to produce a digitized main polarization;
(d) digitizing the cross polarization utilizing the regenerated clock signal to produce a digitized cross polarization;
(e) extracting an interference wave component with respect to the main polarizatiion from the digitized cross polarization to produce an extracted interference wave component;
(f) subtracting the extracted interference wave component from the digitized main polarization to produce a subtracted digitized main polarization;
(g) detecting a phase difference between the extracted interference wave component and the subtracted digitized main polarization; and (h) shifting a phase of the clock signal based on the detected phase difference.

12. A method for cancelling cross polarization interference according to claim 11, wherein said step (g) further comprises discriminating an inclination of the interference wave component with respect to the main polarization, if possible.

13. A method for cancelling cross polarization interference according to claim 12, wherein said step (g) further comprises logically determining whether a phase of the interference wave component should be advanced or delayed.

14. A method for cancelling cross polarization interference according to claim 13, wherein said step (g) further comprises determining an amount of the phase shift of the interference component, if necessary.

* * * * *